(12) United States Patent
Derouet

(10) Patent No.: US 7,881,478 B2
(45) Date of Patent: Feb. 1, 2011

(54) METHOD FOR CONTROLLING ACCESS TO AN ENCRYPTED PROGRAMME

(75) Inventor: Odile Derouet, Montrouge (FR)

(73) Assignee: Nagra Thomson Licensing, Boulogne-Billancourt (FR)

( * ) Notice: Subject to any disclaimer, the term of this patent is extended or adjusted under 35 U.S.C. 154(b) by 1937 days.

(21) Appl. No.: 10/479,467

(22) PCT Filed: Jun. 10, 2002

(86) PCT No.: PCT/FR02/01974

§ 371 (c)(1), (2), (4) Date: Jun. 2, 2004

(87) PCT Pub. No.: WO02/102074

PCT Pub. Date: Dec. 19, 2002

(65) Prior Publication Data

US 2004/0202331 A1    Oct. 14, 2004

(30) Foreign Application Priority Data

Jun. 12, 2001    (FR) ................................. 01 07658

(51) Int. Cl.
- *B41K 3/38* (2006.01)
- *H04K 1/00* (2006.01)
- *H04L 9/08* (2006.01)
- *H04L 9/32* (2006.01)
- *G06F 7/04* (2006.01)
- *G06F 17/30* (2006.01)
- *H04N 7/16* (2006.01)
- *H04N 7/167* (2006.01)

(52) U.S. Cl. .................. 380/281; 380/59; 380/255; 726/2; 726/27; 713/168; 725/31

(58) Field of Classification Search .................. 380/281
See application file for complete search history.

(56) References Cited

U.S. PATENT DOCUMENTS

| 4,423,287 A | * | 12/1983 | Zeidler ......................... 705/71 |
| 4,453,074 A | * | 6/1984 | Weinstein ..................... 705/66 |
| 5,124,117 A | * | 6/1992 | Tatebayashi et al. ........ 380/281 |

(Continued)

FOREIGN PATENT DOCUMENTS

EP    1 051 036    11/2000

(Continued)

OTHER PUBLICATIONS

Data Encryption Standard (DES), FIPS PUB 46-2, Jan. 22, 1988.*

*Primary Examiner*—Nasser Moazzami
*Assistant Examiner*—Oscar A Louie
(74) *Attorney, Agent, or Firm*—Osha Liang LLP

(57) ABSTRACT

An access control method is described for an encrypted program transmitted by an operator to a plurality of groups of subscribers, where each group of subscribers has a group key KG, and each subscriber is able to receive from the operator an operating key KT, enciphered by the group key KG for decryption of the transmitted program. The method further involves linking the enciphered operating key KT to a random value R to generate a secret code, transmitting the secret code to subscribers prior to transmission of the encrypted program, and transmitting the random value R to subscribers for calculation of the operating key KT.

13 Claims, 4 Drawing Sheets

U.S. PATENT DOCUMENTS

| | | | | |
|---|---|---|---|---|
| 5,265,164 A | * | 11/1993 | Matyas et al. | 380/30 |
| 5,319,705 A | * | 6/1994 | Halter et al. | 705/54 |
| 5,600,720 A | * | 2/1997 | Iwamura et al. | 380/1 |
| 5,708,714 A | * | 1/1998 | Lopez et al. | 713/180 |
| 5,870,474 A | * | 2/1999 | Wasilewski et al. | 380/211 |
| 5,995,625 A | * | 11/1999 | Sudia et al. | 705/51 |
| 6,055,314 A | * | 4/2000 | Spies et al. | 380/228 |
| 6,061,799 A | * | 5/2000 | Eldridge et al. | 726/20 |
| 6,105,134 A | * | 8/2000 | Pinder et al. | 713/170 |
| 6,157,719 A | * | 12/2000 | Wasilewski et al. | 380/210 |
| 6,246,767 B1 | * | 6/2001 | Akins et al. | 380/210 |
| 6,286,103 B1 | * | 9/2001 | Maillard et al. | 726/26 |
| 6,466,671 B1 | * | 10/2002 | Maillard et al. | 380/227 |
| 6,629,243 B1 | * | 9/2003 | Kleinman et al. | 713/163 |
| 6,731,755 B1 | * | 5/2004 | Cocks | 380/30 |
| 7,155,611 B2 | * | 12/2006 | Wajs et al. | 713/182 |
| 7,239,704 B1 | * | 7/2007 | Maillard et al. | 380/210 |
| 2002/0129249 A1 | * | 9/2002 | Maillard et al. | 713/172 |

FOREIGN PATENT DOCUMENTS

| | | |
|---|---|---|
| EP | 1111923 A1 * | 6/2001 |
| WO | 99 09743 | 2/1999 |
| WO | 99/18729 A1 | 4/1999 |
| WO | WO 9941874 A1 * | 8/1999 |
| WO | WO 9941907 A1 * | 8/1999 |

* cited by examiner

US 7,881,478 B2

METHOD FOR CONTROLLING ACCESS TO AN ENCRYPTED PROGRAMME

TECHNICAL FIELD

This invention relates to an access control method for an encrypted program transmitted by an operator to a plurality of groups of subscribers, each group of subscribers having a group key KG, and each subscriber receiving from the operator, when the encrypted program is transmitted, an operating key KT enciphered by the group key KG, for decryption of the transmitted program.

PRIOR ART

Using the DVB standard, transmitted programs are encrypted using a control word CW that is changed at the end of the period for which the program is transmitted. A new control word for the same program or for a new program is transmitted to subscribers with the ECM and EMM access control messages (respectively "Entitlement Control Message" and "Entitlement Management Message").

ECMs have three fields, the first field contains the access parameters that define the conditions for access to the encrypted program, such as for example parental control or geographic restriction of reception for the transmitted program, the second field contains the control word CW enciphered by the operating key KT and the third field contains the integrity control parameters for the transmitted data.

EMMs generally have four fields, the first field is an address field for selecting an individual decoder, the second field contains the user's access authorisation, the third field contains the operating key KT enciphered by the group key KG, and the fourth field contains the integrity control parameters for the transmitted data.

ECMs are transmitted with the encrypted program whilst EMMs are usually transmitted prior to the transmission date for such programs.

For a group of subscribers g, the result of enciphering the operating key KT by the group key KG is issued in an enciphered EMM, $EMM_g = F(KT, KG)$ where F is an enciphering algorithm. When a decoder receives this EMM, it checks whether the operating key KT has already been stored, in a smart card for example. If not, the key is deciphered using the inverse function $F^{-1}$ then stored in the smart card. When the encrypted program is transmitted the key KT is used by the enciphering algorithm to decipher the control word CW which was used to encrypt the data for the transmitted program.

FIG. 1 shows a diagram of an example of a system for receiving encrypted programs transmitted by an operator 1. To receive these programs a subscriber needs a receiver 2, a decoder 4 and a smart card 6 which must be inserted in the decoder 4 and on which is stored the group key KG common to a group of cards N, N being 256, for example. A modem 8 connected to the subscriber's telephone line provides a feedback channel between the subscriber and the operator 1. An aerial 12 receives the signals transmitted by the operator 1 and transmits them to the decoder 4.

FIG. 2 shows a diagram of how the system in FIG. 1 works.

The operator 1 sends an operating key KT enciphered using the group key KG for each group to a transmission system 14 (arrow 15). The transmission system 14 sends the whole $EMM_i = F(KG_i, KT)$ to each decoder 4 (arrows 17). Each decoder 4 transfers the $EMM_g$ for the group to the smart card 6 (arrows 18) of a subscriber in group g. When it receives the $EMM_g$, the smart card 6 deciphers the key KT using the group key KG and stores the deciphered key. On the date on which an encrypted program is to be transmitted, the operator transmits the $ECM_i$s in a cyclical fashion, with the encrypted program, to the decoders 4. When it receives the $ECM_i$s, the decoder 4 selects the $ECM_i$s for the transmitted key KT and sends them to the smart card.

One weakness of this method stems from the fact that the operating key KT is common to all users. As a result, it is possible for a user, who succeeds in finding out his group key KG, to fraudulently calculate the operating key KT and to transmit it.

The purpose of this invention is to identify the origin of a fraudulent transmission of an operating key KT.

Another purpose of this invention is to make it impossible for a potential defrauder to predict the date on which an operating key KT will be used.

In an first embodiment of the invention, the method comprises the following steps:

Prior to transmission of the encrypted program, a—linking the enciphered operating key KT to a random value R to generate a secret code;

b—transmitting this secret code to subscribers, and c—transmitting the random value R to subscribers for calculation of the operating key KT, only when the encrypted program is transmitted.

According to the invention, the secret code is calculated using a reversible arithmetic function.

According to the invention, the reversible arithmetic function is the logical operation XOR.

According to the invention, the secret code calculated is stored in a smart card.

In a second embodiment of the invention, where each subscriber can receive a whole number m of operating keys $KT_i$ from the operator, for decryption of a transmitted program, the method comprises the following steps:

Prior to transmission of the encrypted program, a—linking each enciphered operating key $KT_i$ to a random value $R_i$ to generate a whole number r of distinct secret codes;

b—transmitting the secret codes generated to each subscriber; and c—transmitting the random value $R_i$ to subscribers for calculation of an operating key $KT_i$ among the m $KT_i$ keys, only when the encrypted program is transmitted, and for a period chosen by the operator, d—transmitting a new random value $R_i$ to subscribers to change the operating key $KT_i$.

According to one characteristic of this embodiment, the random values $R_i$ are transmitted successively to subscribers on dates that cannot be predicted.

According to the invention, each secret code is calculated using a reversible arithmetic function.

According to the invention, the secret codes calculated are stored in a smart card.

Thanks to this invention, if a defrauder wishes to publicly transmit the key KT prior to transmission of the program requiring decryption, he must transmit the value of the $EMM_g$, which will enable the operator to identify the group to which the defrauder belongs.

BRIEF DESCRIPTION OF THE FIGURES

Other characteristics and advantages of the invention will be evident from the description that follows, by way of a non-limitative example, with reference to the appended figures in which.

DETAILED DESCRIPTION OF THE MODE FOR IMPLEMENTATION OF THE INVENTION

In the following description, identical numerals are used to identify the components and steps that are common to the prior art and to the invention method.

Figure 1:
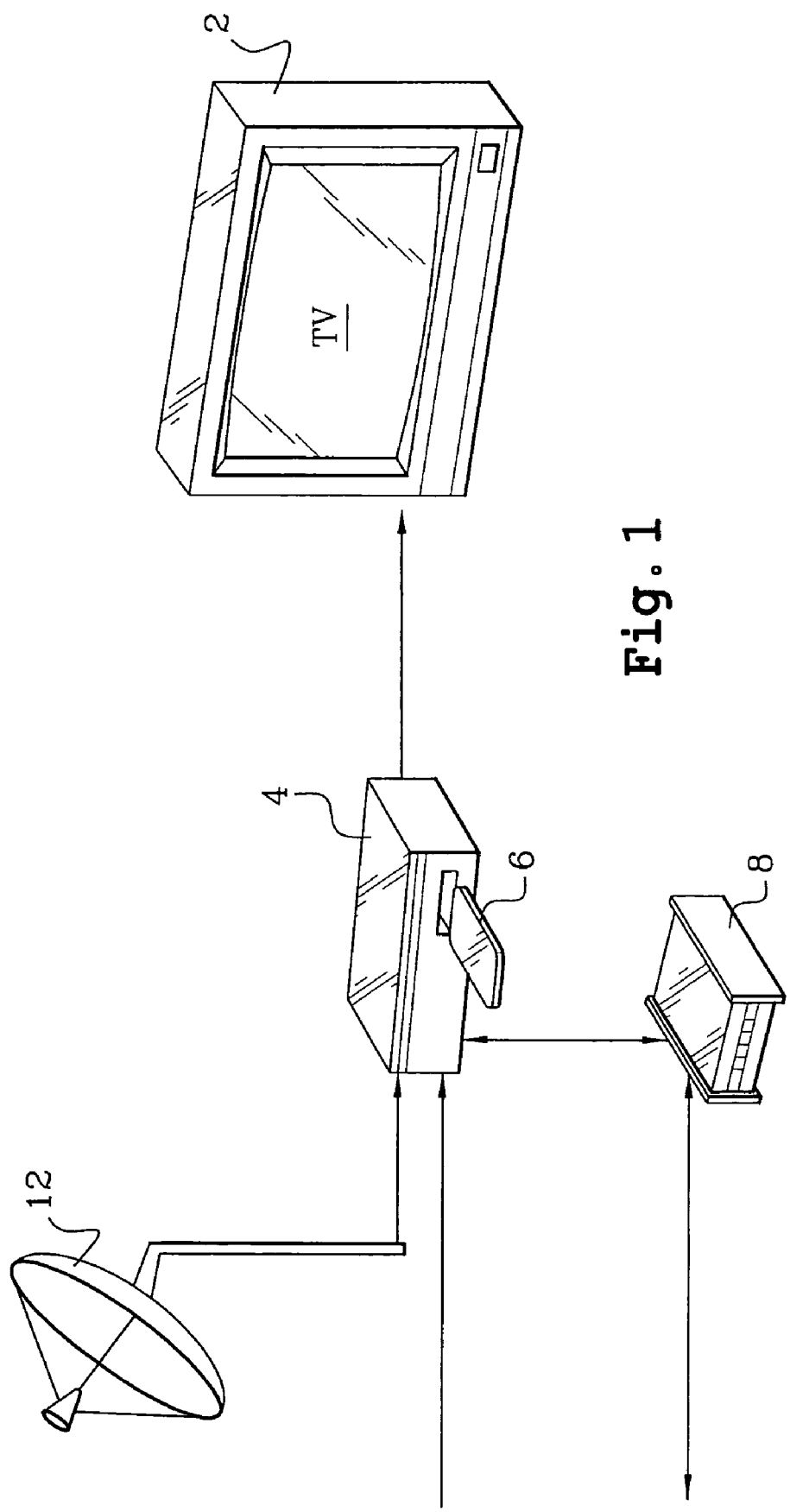
FIG. 1 described above shows a known example of a system for receiving encrypted programs.
Figure 2:
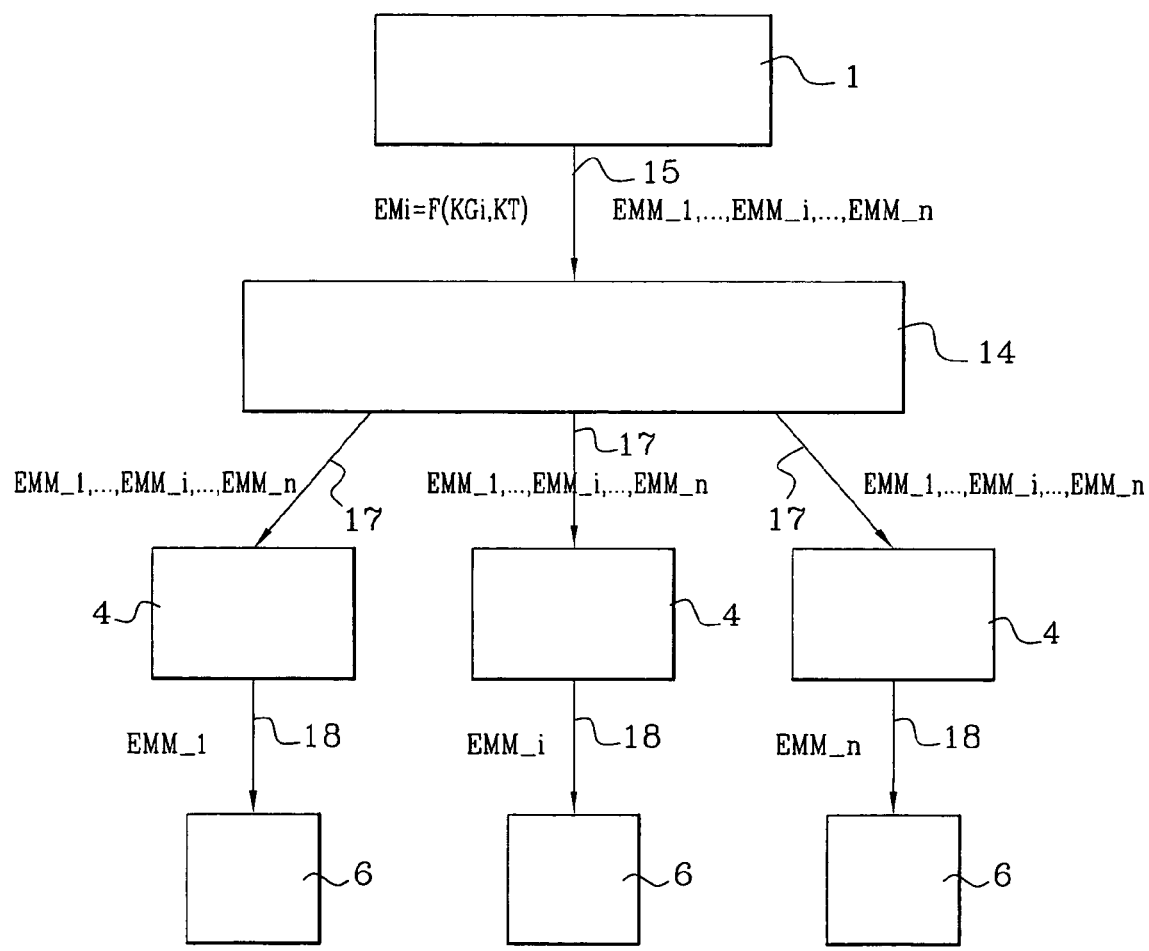
FIG. 2 described above shows an operation diagram of the system shown in FIG. 1.
Figure 3:
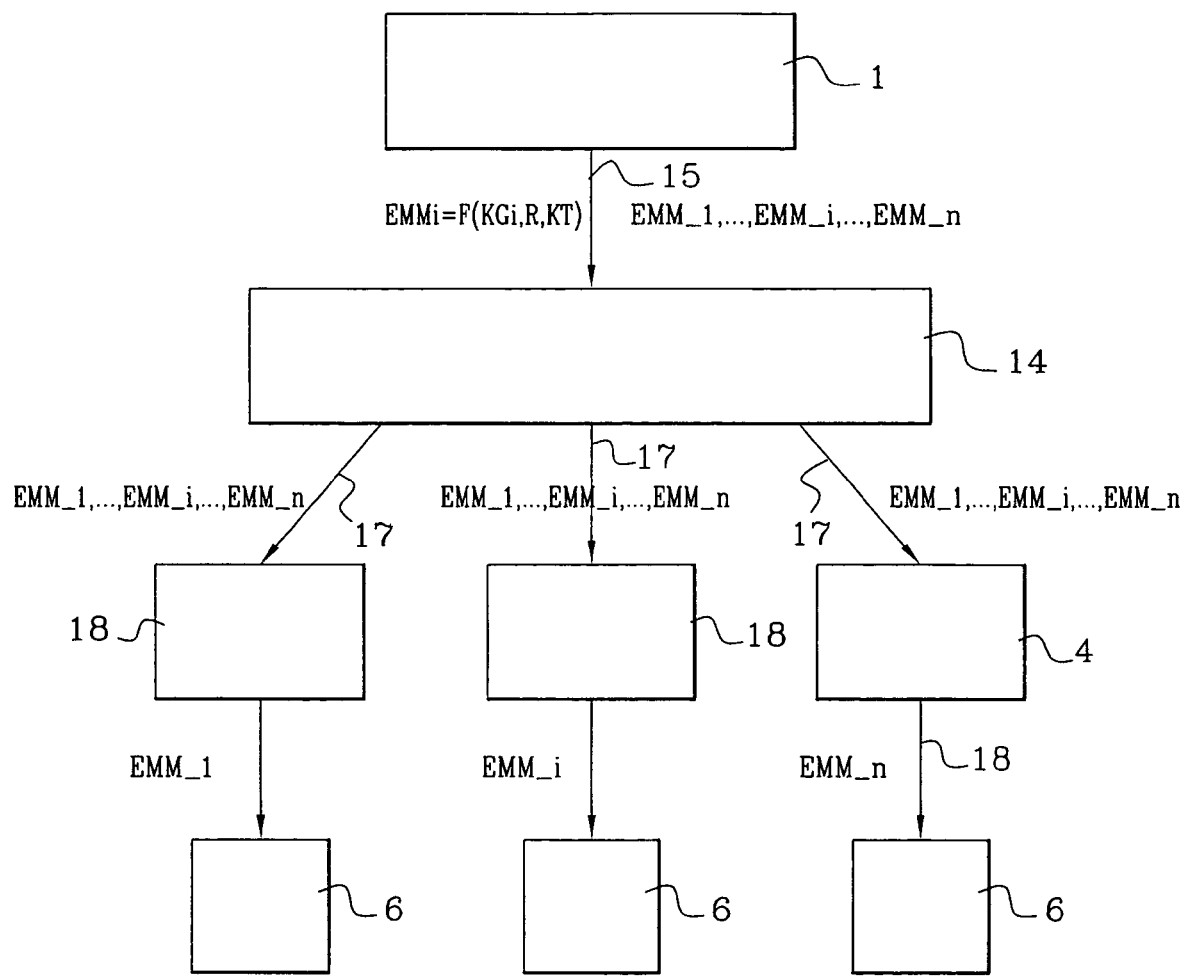
FIG. 3 shows a diagram of an initial embodiment of the invention method.

With reference to FIG. 3, an operator 1 links a random value R to an operating key KT and sends the resulting secret code to a transmission system 14 (arrow 15). More preferably, the operating key KT enciphered using the group key KG is combined using the logical operation XOR, with the secret random value R. The code generated can only be deciphered if the random value R is revealed. The transmission system 14 then sends to each decoder 4 (arrows 17) for a group i, where i designates a list of a group of subscribers from n distinct groups, an EMM calculated using the formula:

$$EMM_i = F(KG_i, KT) \oplus R.$$

Each decoder 4 transfers the $EMM_i$ for group i to the smart card 6 (arrow 18). On the date on which the encrypted program is to be transmitted, the operator transmits the ECMs in a cyclical fashion, with this program, to the decoders 4. These ECMs contain the control word CW used to encrypt the data for the transmitted program. The decoder 4 selects the $ECM_i$s for the key KT and sends them to the smart card 6, which stores the secret code generated. So long as the operator has not transmitted the random value R, the smart card cannot decipher the secret code to reveal the operating key KT. This enables the operator to transmit the random value R as late as possible, i.e. only when the operating key KT needs to be used to decipher the control word CW. As soon as the key KT is used, the operator transmits the following value to the decoders 4:

$$ECM = R \oplus F(EMMg \oplus R, KG).$$

The algorithm stored by the smart card can then calculate the value for the operating key KT by performing the following operation:

$$KT = F^{-1}(EMM_g \oplus R, KG);$$

The control word can then be revealed using the following formula:

$$CW = F^{-1}(ECM, KT).$$

If a defrauder wishes to publicly transmit the key KT prior to the start of transmission of the encrypted program, he must transmit the value $EMM_g$, which is linked to the group key KG. The operator will be in a position to identify the group to which the defrauder belongs and to withdraw this group's access rights.

This embodiment therefore dissuades the defrauder from transmitting the operating keys KT when he receives the EMMs.

Nevertheless, when the value R is revealed by the operator, the value for the operating key KT can be recalculated and publicly transmitted.

Figure 4:
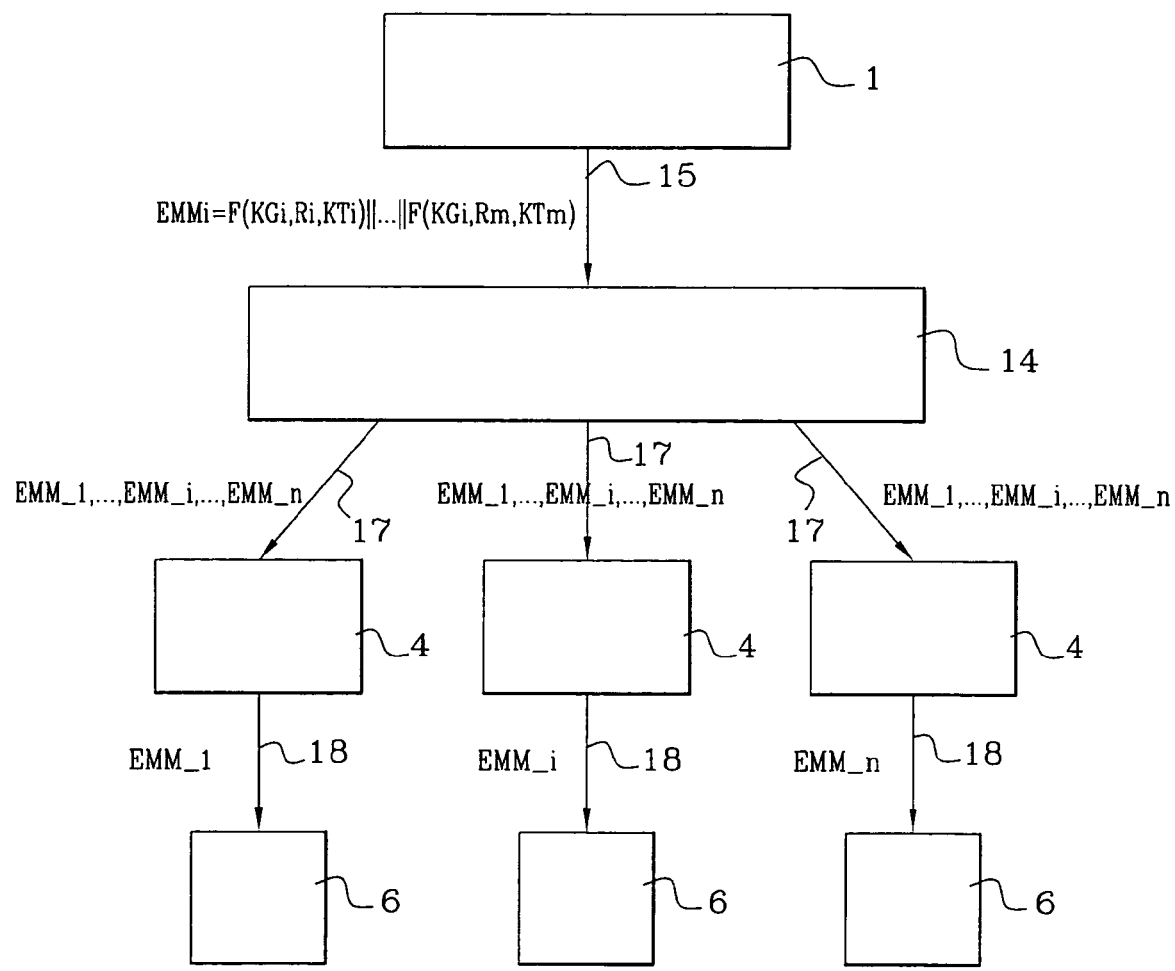
FIG. 4 shows a diagram of a second embodiment of the invention method.

In addition, to prevent this transmission, or at least to make it complicated, according to a second embodiment of the invention shown in FIG. 4, prior to transmission of the encrypted program, the operator 1 sends a whole number m of operating keys $KT_1, KT_2 \ldots KT_i, KT_m$, to the transmission system 14 (arrow 15). Each key $KT_i$ is enciphered using the group key KG for the group i and is linked, using the logical operation XOR, to a secret random value $R_i$, known only to the operator, in such a way as to generate a secret code that can only be deciphered if the number $R_i$ is revealed.

The transmission system 14 transmits all the EMMs calculated using the following formula to each decoder 4 (arrows 17):

$$EMM_i = F(KG_i, KT_1) \oplus R_1 \| F(KG_i, KT_2) \oplus R_2 \| \ldots F(KG_i, KT_i) \oplus R_i \| \ldots F(KG_i, KT_m) \oplus R_m \|.$$

Where the symbol ∥ represents the concatenation operation.

The decoder 4 for the group i transfers the $EMM_i$ for the group to the smart card 6 (arrow 18). On the date on which an encrypted program is to be transmitted, the operator transmits the ECMs in a cyclical fashion, with the encrypted program, to the decoders 4. These ECMs contain the control word CW used to encrypt the data for the transmitted program. The decoder 4 selects the $ECM_i$s that match the key $KT_i$ and sends them to the smart card 6, which stores the secret code generated. So long as the operator has not transmitted the random value $R_i$, the smart card cannot decipher the secret code to reveal the operating key $KT_i$. Each key $KT_i$ remains stored in the smart card 6.

The values $R_i$ are transmitted via the ECMs, in accordance with the key used to encipher the control words.

As soon as the key $KT_i$ is used, the operator transmits the following ECM to the decoder 4:

$$ECM = R_i \| F(CW, KT_i)$$

This embodiment enables the different operating keys $KT_i$ to be allocated a period of validity that is sufficiently short and unpredictable to make fraudulent transmission of a key $KT_i$ complicated once the number $R_i$ has been revealed.

Thanks to this second embodiment, the operator can change the key $KT_i$ in an unpredictable manner depending on the desirability of the programs transmitted.

The invention claimed is:

1. Access control method of an encrypted program transmitted by an operator to a plurality of groups of subscribers, each group of subscribers having a group key KG, and each subscriber being able to receive from the operator an operating key KT, enciphered by the group key KG for decryption of the transmitted encrypted program, the method further comprising:

linking the enciphered operating key KT to a random value R to generate a secret code;

transmitting the secret code to subscribers in a first transmission, prior to transmission of the encrypted program, transmitting the encrypted program along with an entitlement control message (ECM), in a second separate transmission, wherein the ECM comprises a control word used to encrypt the encrypted program, and transmitting the random value R, after transmission of the secret code, to subscribers for calculation of the operating key KT, wherein the random value R is transmitted only when the operating key KT is used to decipher a control word necessary to decrypt the encrypted program, wherein each group of subscribers calculates the operating key KT using the group key KG stored on a decoder associated with the subscribers and the random R, and decrypts the encrypted program using the deciphered control word.

2. The method according to claim 1, wherein the secret code is calculated using a reversible arithmetic function.

3. The method according to claim 2, wherein the reversible arithmetic function is a logical operation XOR.

4. The method according to claim 1, wherein the secret code generated is stored in a smart card.

5. Access control method of an encrypted program transmitted by an operator to a number of groups of subscribers, each group of subscribers being issued with a group key KG, and each subscriber being able to receive from the operator a whole number m of operating keys $KT_i$, for decryption of the encrypted program transmitted, the method further comprising:

linking each enciphered operating key $KT_i$ to a random value R, to generate a whole number m of distinct secret codes;

transmitting the secret codes generated to each subscriber, in a first transmission, prior to transmission of the encrypted program;

transmitting the encrypted program along with an entitlement control message (ECM), in a second separate transmission, wherein the ECM comprises a control word used to decrypt the encrypted program, and transmitting the random value $R_i$, after transmission of the secret code, to subscribers for calculation of an operating key $KT_i$ from the m keys, wherein the random value $R_i$ is transmitted only when the operating key KT is used to decipher the control word necessary to decrypt the encrypted program; and transmitting a new random value $R_i$ to subscribers to change the operating key $KT_i$, wherein each group of subscribers calculates the operating key KT using the group key KG stored on a decoder associated with the subscribers and the random $R_i$, and decrypts the encrypted program using the deciphered control word.

6. The method according to claim 5, wherein the random values $R_i$ are successively transmitted to subscribers on dates that cannot be predicted.

7. The method according to claim 6, wherein each secret code is calculated using a reversible arithmetic function.

8. The method according to claim 7, wherein the reversible arithmetic function is a logical operation XOR.

9. The method according to claim 7, wherein each secret code is stored in a smart card.

10. A smart card, comprising:

a memory for storing a group key KG and a secret code made of an operating key KT enciphered by the group key KG and then linked with a random value R, wherein the operating key KT is used to decipher a control word, and wherein the control word is used to decrypt an encrypted program transmitted to subscribers of a group to which the group key KG belongs, wherein the smart card is configured to receive:

the secret code, in a first transmission, prior to transmission of the encrypted program, the encrypted program, in a second separate transmission, along with an entitlement control message (ECM) comprising the control word, and the random value R, after receiving the secret code, wherein the random value R is transmitted only when the operating key KT is used to decipher the control word necessary to decrypt the encrypted program, and wherein the smart card is configured to calculate the operating key KT from the random value R and the group key KG, and decrypt the encrypted program using the deciphered control word.

11. A method of calculating an operating key, comprising:

storing a group key KG in a decoder, wherein the group key KG is associated with subscribers of an encrypted program;

storing a secret code made of an operating key KT enciphered by the group key KG and then linked with a random value R;

receiving the encrypted program, in a second separate transmission from that which transmitted the secret code, along with an entitlement management message (ECM) comprising a control word used to decrypt the encrypted program;

receiving the random value R, after receiving the secret code and the encrypted program, wherein the random value R is transmitted only when the operating key KT is used to decipher the control word necessary to decrypt the encrypted program; and calculating the operating key KT from the random value R and the group key KG and using the operating key KT to decipher the control word; and decrypting the encrypted program using the deciphered control word.

12. An access control system, comprising:

an operator configured to:

transmit an encrypted program to a plurality of groups of subscribers, wherein each group of subscribers is equipped with a group key KG, and each subscriber is configured to receive an operating key KT from the operator used for decrypting the transmitted encrypted program, wherein the operating key KT is enciphered by the group key KG, and link the enciphered operating key KT with a random value R to generate a secret code; and a transmission system configured to:

transmit, in a first transmission, the secret code to the plurality of groups of subscribers, wherein the secret code is transmitted before the encrypted program is transmitted; and transmit the encrypted program along with an entitlement control message (ECM), in a second separate transmission, wherein the ECM comprises a control word used to encrypt the encrypted program, and transmit the random value R, after transmission of the secret code, wherein the random value R is transmitted only when the operating key KT is used to decipher the control word necessary to decrypt the encrypted program, and wherein the random value R and the group key KG are used to calculate the operating key KT by the plurality of groups of subscribers.

13. An access control system, comprising:

an operator configured to:

transmit an encrypted program to a plurality of groups of subscribers, wherein each group of subscribers is equipped with a group key KG, and each subscriber is configured to receive a whole number m of operating keys KTi from the operator for decryption of the transmitted encrypted program wherein the operating keys $KT_i$ are enciphered by the group key KG, and link, with each enciphered operating key $KT_i$, a random value $R_i$, to generate a whole number m of distinct secret codes; and a transmission system configured to:
- transmit, in a first transmission, to the plurality of groups of subscribers, the generated secret codes, wherein the secret codes are transmitted before transmission of the encrypted program,
- transmit the encrypted program along with an entitlement control message (ECM), in a second separate transmission, wherein the ECM comprises a control word used to encrypt the encrypted program,
- transmit, to the plurality of groups of subscribers, a random value $R_i$, after transmission of the secret code, wherein the random value $R_i$ is transmitted only when the operating key KT is used to decipher the control word necessary to decrypt the encrypted program, and
- wherein the random value $R_i$ and the group key KG are used to calculate an operating key $KT_i$ from among the m operating keys $KT_i$, and
- transmit, to the plurality of groups of subscribers, a new random value $R_i$, used to change the calculated operating key $KT_i$.

* * * * *